US008465685B2

(12) United States Patent
Öquist

(10) Patent No.: US 8,465,685 B2
(45) Date of Patent: Jun. 18, 2013

(54) DEVICE FOR TAKING IMPRESSION OF AN EAR

(76) Inventor: Ola Öquist, Haninge (SE)

( * ) Notice: Subject to any disclaimer, the term of this patent is extended or adjusted under 35 U.S.C. 154(b) by 40 days.

(21) Appl. No.: 13/201,231

(22) PCT Filed: Feb. 23, 2010

(86) PCT No.: PCT/SE2010/050204
§ 371 (c)(1), (2), (4) Date: Aug. 12, 2011

(87) PCT Pub. No.: WO2010/107364
PCT Pub. Date: Sep. 23, 2010

(65) Prior Publication Data

US 2011/0291320 A1 Dec. 1, 2011

(30) Foreign Application Priority Data

Mar. 16, 2009 (SE) ...................................... 0950155

(51) Int. Cl.
*B29C 33/42* (2006.01)

(52) U.S. Cl.
USPC ............................................... 264/222; 425/2

(58) Field of Classification Search
None
See application file for complete search history.

(56) References Cited

U.S. PATENT DOCUMENTS 3,440,314 A * 4/1969 Frisch ............................ 264/222
5,131,411 A 7/1992 Casali et al.
5,440,082 A * 8/1995 Claes ............................ 181/135

FOREIGN PATENT DOCUMENTS

WO 92/03894 3/1992
WO 01/08443 2/2001
WO 02/21894 3/2002
WO 02/067629 8/2002

OTHER PUBLICATIONS

International Search Report issued on Jun. 10, 2010 in International Application No. PCT/SE2010/050204 filed Feb. 23, 2010.

* cited by examiner

*Primary Examiner* — Mary F Theisen
(74) *Attorney, Agent, or Firm* — Drinker Biddle & Reath LLP

(57) ABSTRACT

Device for taking an impression of a subject's ear minimizes risk of damage on the eardrum when the impression is made. The device comprises a nozzle having a first essentially tubular part that has a centre axis and a side wall. The first tubular part has also a first end intended to be inserted into a subject's ear, a first opening for the outlet of impression material, and a second end connected to a supply member for impression material to the tubular part.

The first opening has a centre axis that is essentially perpendicular to the centre axis of the first tubular part at the point where the two centre axes intersect each other, alternatively has a direction, as seen from the centre axis of the first tubular part through the side wall, from said first end. The first opening is preferably arranged in the side wall of the tubular part.

19 Claims, 4 Drawing Sheets

DEVICE FOR TAKING IMPRESSION OF AN EAR

CROSS REFERENCE TO RELATED APPLICATIONS

This application is a §371 National Stage Application of PCT International Application No. PCT/SE2010/050204, filed Feb. 23, 2010, and claims priority under 35 U.S.C. §119 and/or §365 to Swedish Application No. 0950155-2 filed Mar. 16, 2009.

The present invention relates to a device for taking an impression of a subject's ear comprising a nozzle intended for introduction of impression material into the subject's ear. The nozzle has a first tubular part intended to be inserted into the subject's auditory canal. The tubular part has an opening for the outlet of impression material into the subject's auditory canal.

The present invention also relates to a method for taking an impression of a subject's ear, which impression can work as mould in the manufacturing of an individually adapted ear insert, such as a hearing aid, earphone or ear protection.

BACKGROUND

It is important that a hearing aid fits well in a subject's ear. Therefore, an impression of the subject's external ear is first made. The impression is then used as a mould for manufacturing an individually adapted ear insert or a shell of a hearing aid.

The impression is usually made by a plug of foam rubber, cotton or the like first being inserted into the auditory canal to protect the eardrum from the impression material and damage during the impression process. A nozzle of an impression gun containing impression material is then inserted into the auditory canal approximately 5-6 mm and the impression material is thereafter injected gently into the auditory canal so that it fills up the space in the auditory canal and starts flowing back out past the tip/mouth of the nozzle. Next, the impression gun is retracted slowly out of the ear while impression material still is supplied. When the entire auditory duct is filled with the impression material, this is allowed to solidify, which usually takes approx. 5 to 10 minutes, whereupon the impression is removed gently from the ear. Also the protecting plug is removed. Next, the ear is inspected to guarantee that there is no impression material left in the ear.

The impression material usually consists of two components, which react when they are mixed, and thereby solidify.

The impression is then used as a mould for manufacturing an individually adapted ear insert. This may, for instance, be carried out by the surface of the impression being scanned by means of a laser, and data from the laser is processed in a computer in order to be transformed into a three-dimensional model. This three-dimensional model may then be used for the manufacture of the individually adapted ear insert.

FIG. 10 shows an example of a device for taking an impression of a subject's ear in the form of an impression gun 10. The impression gun 10 has a holder handle 11 and an operating handle 12. The impression gun 10 also comprises containers for impression material. It is common that the impression material consists of two components that are mixed immediately before or during the introduction into the ear. Therefore, the impression gun shown in FIG. 10 has a first container 13 for a first component of an impression material as well as a second container 14 for a second component of an impression material. These two components are pressed out into the nozzle 15 of the impression gun when the operating handle 12 is moved toward the holder handle 11 and are ejected from the nozzle 15 into a subject's ear for taking an impression of the ear.

The technique for manufacturing ear inserts described above may also be used in the same way for manufacturing individually adapted ear plugs or individually adapted earphones.

There is however a risk of impression material penetrating past the plug intended to protect the eardrum, which risks that the eardrum is damaged when the impression is made or removed from the ear. Therefore, these impressions are made by specially trained personnel being well-acquainted with the risks. If the impression material cannot be removed from the ear after the impression has been made, in the worst case, an operation to remove remaining impression material may have to be made.

SUMMARY OF THE INVENTION

The object of the present invention is to decrease the risk of the emergence of damage in a subject's ear, above all of the eardrum, when an impression of the external ear is to be made.

The object is achieved by a device for taking impressions of a subject's ear, including a nozzle having an essentially tubular part that has a centre axis and a side wall, the tubular part including a first end intended to be inserted into a subject's ear, a first opening for the outlet of impression material, as well as a second end connected to a supply member for impression material to the tubular part, wherein the first opening has a centre axis that is essentially perpendicular to the centre axis of the tubular part alternatively has a direction, as seen from the centre axis of the tubular part through the side wall, from the first end, and wherein the tubular part includes a plurality of openings serving as outlets for impression material, and a method for taking an impression of a subject's ear using such a device.

The present invention is based on the principle that the impression material is inserted into the auditory canal in such a way that its flow primarily is directed from the eardrum toward the entrance of the auditory canal and/or essentially toward the wall of the auditory canal. Thereby, the risk of the eardrum being damaged when the impression is to be made is minimized, and thereby makes the impression process considerably easier. This is accomplished by means of the device according to the invention.

The device comprises a nozzle having a first essentially tubular part. The first tubular part has a centre axis and a side wall. The first tubular part also has a first end intended to be inserted into a subject's ear, a first opening for the outlet of impression material into the auditory canal of the subject's ear, as well as a second end connected to a supply member for impression material to the tubular part.

The nozzle may also have a second tubular part. Hereinafter, a tubular part should however be considered to be the part of the nozzle that is intended to be inserted into a subject's ear, more precisely in the auditory canal. In the case the nozzle has a second tubular part, this constitutes the above mentioned supply member for impression material.

The first opening has a centre axis that is essentially perpendicular to the centre axis of the first tubular part at the point where the two centre axes intersect each other, alternatively has a direction, as seen from the centre axis of the first tubular part through the side wall, from said first end. The first opening is preferably arranged in the side wall of the tubular part.

According to one embodiment, the tubular part has a plurality of openings arranged in the side wall of the tubular part serving as outlets for impression material into the subject's ear. Preferably, the tubular part is provided with openings distributed essentially along the entire part of its extension that is intended to be in the auditory canal during the impression process. The presence and arrangement of the plurality of openings and the distribution thereof ensure that the impression material is introduced into the subject's ear in a direction which minimises flow of impression material towards the eardrum of the subject. Each opening may preferably have a centre axis that is essentially perpendicular to the centre axis of the tubular part, alternatively has a direction, as seen from the centre axis of the tubular part through the side wall, from said first end.

According to a preferred embodiment, a limiting member having an essentially circular cross-section is arranged adjacent to the first end of the tubular part in such a way that the diameter of said limiting member is essentially perpendicular to the centre axis of the tubular part. The purpose of said limiting member is first of all that it should work as a plug during the impression process and in such a way protect the eardrum from impression material. The member may suitably be cup-shaped, whereby it assists in further guiding the flow of impression material toward the entrance of the auditory canal.

According to an alternative embodiment of the invention, said tubular part is, in the vicinity of said first end, curved at an angle that is equal to or greater than 90° so that said first opening, which is arranged in the first end of the tubular part, is essentially directed toward the wall and/or mouth of the auditory canal when said nozzle is inserted in a subject's ear.

The tubular part may have a primarily curved shape along its extension in order to easier be insertable into the subject's ear, but may also have an essentially straight extension. Preferably, the nozzle may also have a tapered shape toward the first end of the nozzle, i.e., the end that is intended to be inserted into the subject's ear.

The device may suitably be an impression gun that has a nozzle having a tubular part as has been described above. The impression gun has suitably at least one container for impression material, a holder handle and an operating handle.

The invention also concerns a method for taking an impression of a subject's ear, wherein impression material is supplied to the ear by means of a device, as has been described above, and is allowed to solidify in order to form the impression, whereupon the impression is removed from the ear.

DETAILED DESCRIPTION OF THE INVENTION

The invention is described below in detail by means of the figures. The figures should not be considered to be true to scale since certain details have been enlarged to more clearly illustrate the invention. The invention should not be considered to be limited to the embodiments shown in the figures but may be varied within the scope of the independent claims.

Figure 1:
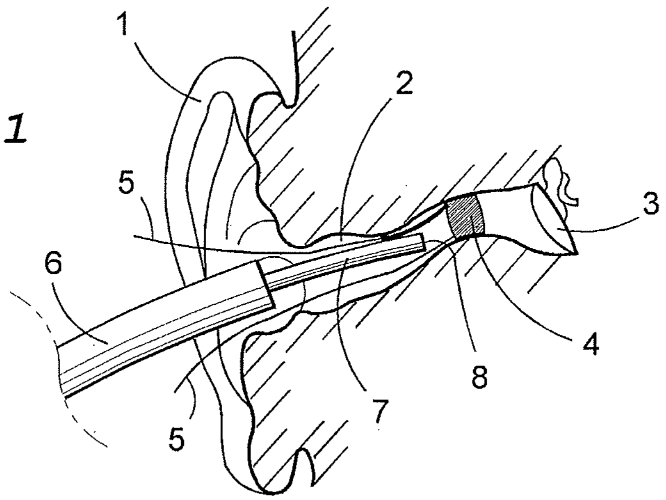
FIG. 1 shows an external ear of a subject as well as the nozzle of a device having a tubular part in accordance with prior art.

FIG. 1 shows an ear 1 having an auditory canal 2 as well as an eardrum 3. In accordance with prior art, a plug 4 is first inserted to protect the eardrum 3 when an impression of the external ear is to be made. Said plug 4 is usually made of a foam-rubber material, alternatively cotton, and may be provided with threads 5 to make it easier when it is to be removed after the impression process. Impression material is supplied to the auditory canal 2 by means of, for instance, an impression gun (not shown) that has a nozzle 6 having a tubular part 7 intended to be inserted into the auditory canal 2. The impression material is injected gently into the auditory canal 2 via the opening 8 of the nozzle toward the protecting plug 4 until the impression material starts flowing back over the tubular part 7. The nozzle 6 and the tubular part 7 thereof are brought out of the ear slowly while additional impression material is injected in such a way that the opening 8 of the nozzle all the time is covered by injected impression material.

After the auditory canal as well as the outermost part of the ear is filled by impression material, the nozzle is removed and the impression material is allowed to solidify, which usually takes approx. 5-10 min. Next, the solidified impression material, which now is in the form of an impression, is gently removed from the ear. The plug 4 may then be removed gently by means of the threads 5. In order to guarantee that there is no remaining impression material in the ear, an inspection of the auditory canal and the eardrum is made.

This previously known technique for taking impressions of an ear involves certain risks for the subject. Among other things, impression material may penetrate past the protecting plug and thereby risk damaging the subject's eardrum.

The present invention minimizes the risks of the previously known technique by the fact that the impression material, instead of being directed inward toward the eardrum, is brought to flow essentially from the eardrum out toward the entrance of the auditory canal, alternatively toward the wall of the auditory canal instead of toward the eardrum. This is accomplished by means of the device according to the invention.

The device comprises a nozzle having a first essentially tubular part having a longitudinal centre hole essentially through the extension of the entire part. The first tubular part has a centre axis and a side wall, which side wall defines said longitudinal centre hole. The first tubular part has also a first end intended to be inserted into a subject's ear, a first opening for the outlet of impression material, as well as a second end connected to a supply member for impression material to the tubular part.

The nozzle may also have a second tubular part, but hereinafter, a tubular part should be considered to be the part of the nozzle that is intended to be inserted into a subject's ear, more precisely intended to be inserted into the auditory canal of a subject. In the case the nozzle has a second tubular part, this constitutes the above mentioned supply member for impression material.

The first opening has a centre axis that is essentially perpendicular to the centre axis of the first tubular part at the point where the two centre axes intersect each other, alternatively has a direction, as seen from the centre axis of the first tubular part through the side wall, from said first end. The first opening is preferably arranged in the side wall of the tubular part.

According to a preferred embodiment, the tubular part has a plurality of openings each one of which has a centre axis that is essentially perpendicular to the centre axis of the tubular part, alternatively has a direction, as seen from the centre axis of the tubular part through the side wall, from said first end. The openings are preferably arranged along the extension of the tubular part.

The first opening or the openings are naturally entirely going through the side wall of the tubular part.

Figure 2:
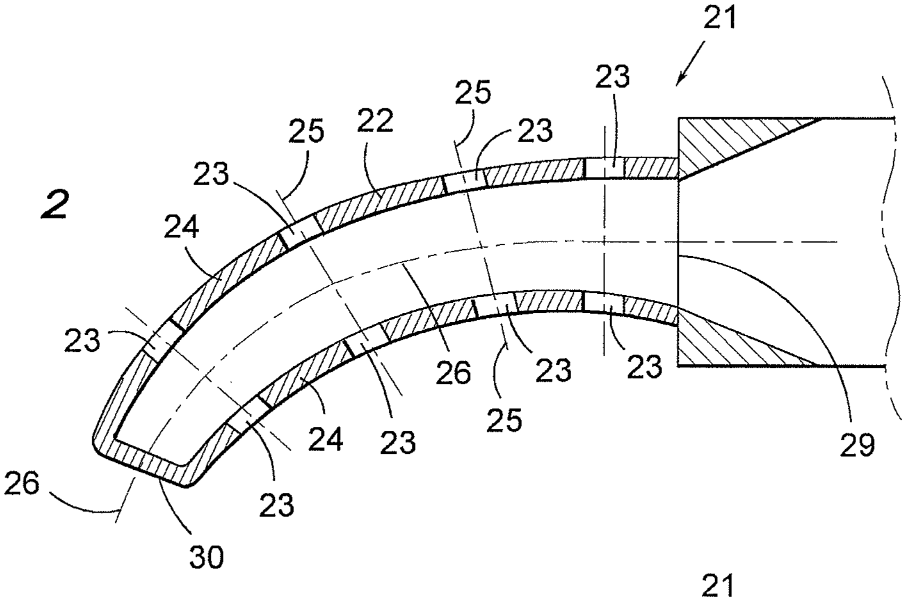
FIG. 2 shows a cross-section of the tubular part of the nozzle in accordance with a first embodiment of the invention where the openings have a centre axis that is essentially perpendicular to the centre axis of the tubular part.

FIG. 2 shows a cross-section of an embodiment of a nozzle 21 having a tubular part 22 according to the invention. The tubular part 22 has a plurality of openings 23 in the side wall 24 thereof, each one of which openings 23 has a centre axis 25 that is perpendicular to the centre axis 26 of the tubular part. The tubular part 22 according to the figure has a curved shape to easier be insertable into a subject's ear, also the centre axis 26 thereof being curved. The centre axis 25 of each one of the openings 23 is accordingly perpendicular to the direction of the centre axis 26 of the tubular part at the point where the centre axes 25, 26 intersect each other. Accordingly, the centre axes 25 of the different openings 23 have different directions in comparison with each other.

However, it is also feasible that the tubular part 22, and consequently the centre axis 26 thereof, has an essentially straight extension. In this case, the centre axes 25 of the different openings 23 become essentially parallel to each other.

By the openings 23 being arranged in the above way, the impression material will be brought to flow out from the openings 23 essentially toward the walls of the auditory canal, instead of toward the eardrum.

As is shown in FIG. 2, the first end 30 of the tubular part is closed and has accordingly no openings. However, the second end 29 of the tubular part has an opening to receive impression material from the other parts of the device (not shown), such as a container for impression material, via the rest of the nozzle 21.

Figure 3:
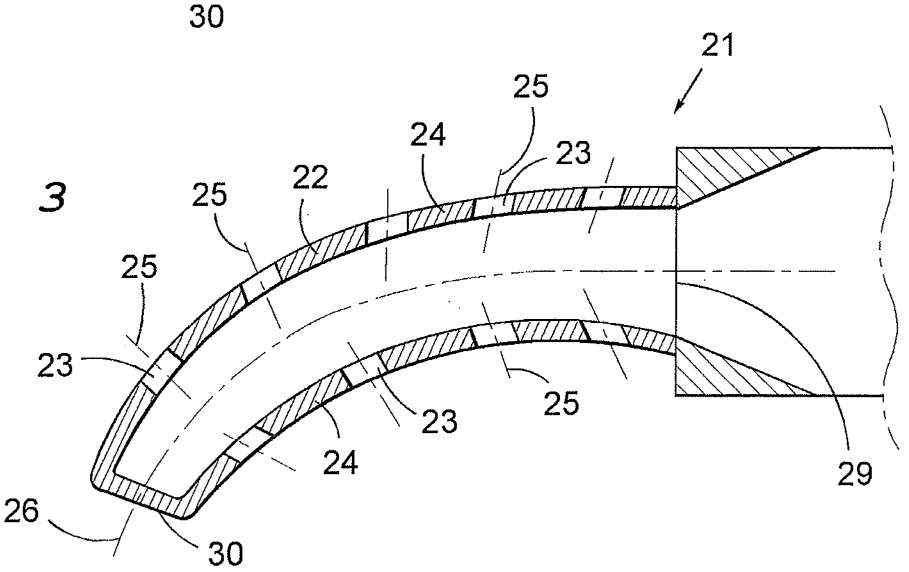
FIG. 3 shows a cross-section of the tubular part of the nozzle in accordance with a second embodiment of the invention where the openings have a centre axis that has a direction from the first end of the tubular part.

FIG. 3 shows a preferred embodiment of the invention where the tubular part 22 of the nozzle comprises a plurality of openings 23 arranged in the side wall 24 thereof. According to this embodiment, the openings 23 are arranged so that the respective centre axis 25 thereof has a direction that is essentially from the first end 30 of the tubular part, as seen from the centre axis 26 of the tubular part out through the side wall 24 thereof. By the openings 23 being arranged in this way, the impression material is brought to flow obliquely outward and rearward from the tubular part 22, i.e., obliquely outward toward the entrance of the auditory canal when the nozzle is inserted in the auditory canal.

Figure 4:
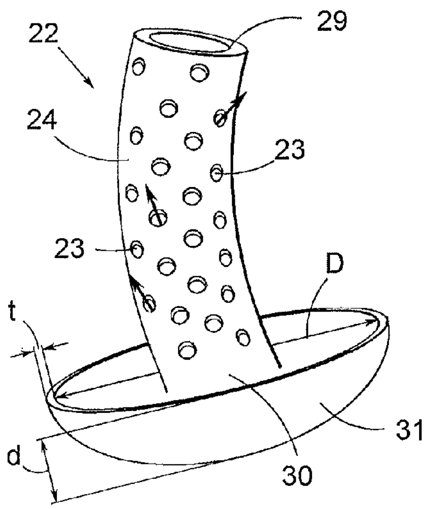
FIG. 4 shows the tubular part of the nozzle in accordance with a third embodiment of the invention where a limiting member having a circular cross-section is arranged at the first end of the tubular part.

FIG. 4 shows the tubular part 22 according to a preferred embodiment of the invention. The tubular part 22 comprises a plurality of openings 23 arranged in the side wall 24 thereof for the outlet of impression material. The openings 23 are arranged so that the respective centre axis thereof (not shown) have a direction that is essentially from the first end 30 of the tubular part, as seen from the centre axis (not shown) of the tubular part, out through the side wall 24 thereof. By the openings 23 being arranged in this way, the impression material is brought to flow obliquely outward and rearward from the tubular part 22 as is illustrated by means of the arrows, i.e., obliquely outward toward the entrance of the auditory canal when the tubular part is inserted in the auditory canal. However, it is also feasible that the openings are arranged in such a way that the centre axes thereof are essentially perpendicular to the centre axis of the tubular part, as shown in FIG. 2.

A limiting member 31 that has an essentially circular cross-section is arranged at the first end 30 of the tubular part. The cross-section of the limiting member 31 should be adapted to the cross-section of an auditory canal, an essentially circular cross-section should therefore, in this connection, also be considered to comprise a slightly oval cross-section.

The limiting member 31 has a diameter D that is essentially perpendicularly arranged to the direction of the centre axis of the tubular part in the first end 30 of the tubular part. Furthermore, the limiting member 31 is preferably arranged at the first end 30 of the tubular part in such a way that the centre axis of the tubular part essentially coincides with the cross-sectional centre of said limiting member. This guarantees that the tubular part is arranged essentially in the middle along the centre axis of the auditory canal, when it is inserted in a subject's auditory canal, and has in such a way the most suitable position for uniform supply of impression material to the auditory canal.

The limiting member 31 shown in FIG. 4 is essentially cup-shaped and has a depth d and a wall thickness t. The surface of the limiting member 31 bulges from said first end 30, as is illustrated in the figure. Accordingly, there is a space between the side wall of the tubular part and the limiting member 31 where it has the largest diameter.

It is also feasible that the limiting member 31 may have an essentially flat circular shape. In this case, it has accordingly a diameter and a wall thickness, but no depth.

Figure 6:
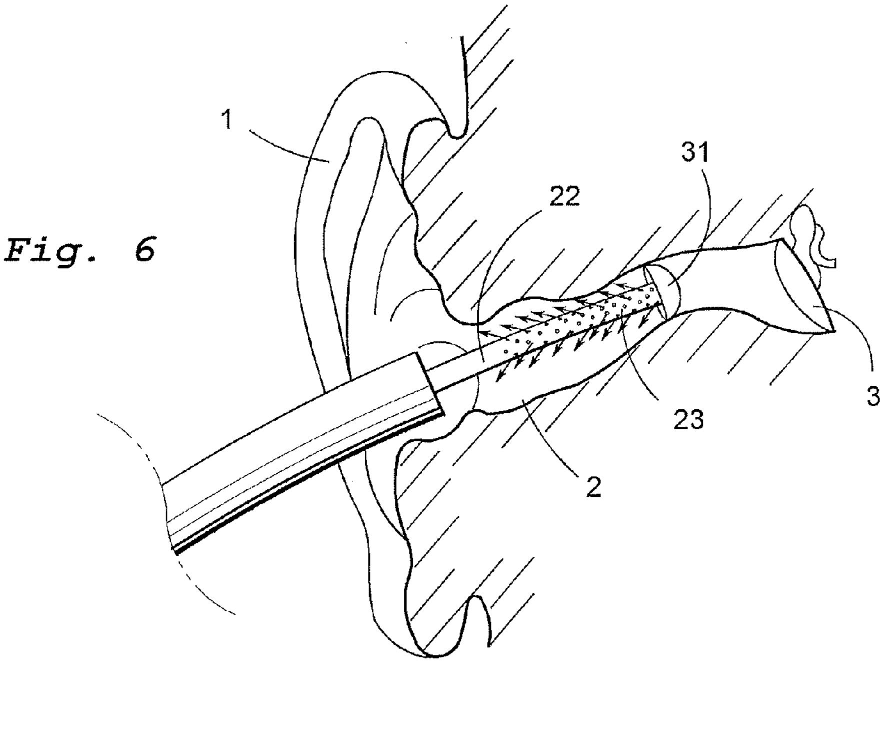
FIG. 6 shows an external ear of a subject in which the tubular part according to FIG. 4 is inserted.

When the limiting member 31 is cup-shaped, it will be arranged in such a way that the bottom of the cup shape is arranged at the first end 30 of the tubular part and the walls of the cup shape have an extension on the outside of the side walls of the tubular part so that a gap between the side walls of the tubular part and the walls of the limiting member is formed. Accordingly, the limiting member 31 will be convex inward toward the eardrum when it is inserted in the subject's auditory canal, which also is shown in FIG. 6.

The object of the limiting member 31 is to work as a plug and thereby further decrease the risk of impression material contacting the eardrum. This means that there is no need of a separate plug of foam rubber or cotton, as has been used previously. When the limiting member 31 is cup-shaped, it further facilitates that the flow of the impression material is directed outward toward the entrance of the auditory canal, since this forces the impression material to flow outward out of the ear. Furthermore, the cup shape facilitates the introduction of the limiting member into the auditory canal to a suitable depth for the impression process.

The diameter D of the limiting member is suitably adapted to the size of the auditory canal of the subject, and may accordingly vary.

The limiting member 31 is suitably made of a flexible material, such as an elastically deformable material, in order to guarantee that it does not damage the walls of the auditory canal. It may, for instance, be made of silicone or the like.

When using a device that is provided with a limiting member as has been described above, the tubular part of the nozzle is allowed to be left in the auditory canal of the subject while the impression material solidifies. In order for the person that makes the impression should not need to hold the device while the impression material solidifies, the nozzle may preferably be detached from the rest of the device. Preferably, only the tubular part of the nozzle having the limiting member, i.e., the part that is inserted into the auditory canal, is left during the solidifying process.

Figure 5:
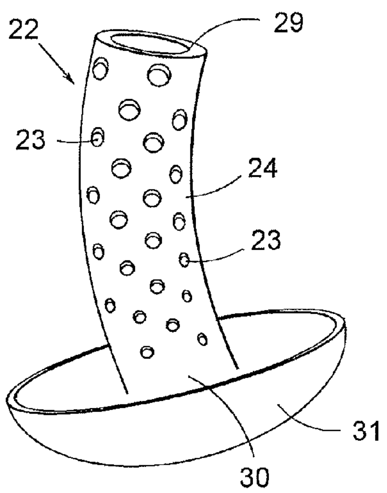
FIG. 5 shows the tubular part of the nozzle in accordance with a fourth embodiment of the invention where the size of the openings is larger at the second end of the tubular part than at the first end thereof.

FIG. 5 shows an embodiment that essentially corresponds to the embodiment according to FIG. 4, but wherein the size of the openings 23 is larger at the second end 29 of the tubular part than the openings 23 at the first end 30 of the tubular part. Too large holes in the part of the tubular part that is furthest inside the auditory canal may constitute a problem, since there the flow of the impression material changes direction. The embodiment shown in FIG. 5 is advantageous, since it will supply more material to the auditory canal closer to the entrance of the auditory canal. This guarantees that a sufficient amount of impression material is supplied to the entire auditory canal. The size of the openings 23 may preferably increase gradually toward the second end 29 of the nozzle.

FIG. 6 shows an ear 1 where the tubular part 22 of the nozzle according to FIG. 4 is inserted in the auditory canal 2. The limiting member 31 is inserted so that it essentially fills up the cross-section of the auditory canal just before the eardrum 3 and protects in such a way the eardrum from the impression material when this is injected into the auditory canal. The limiting member 31 is cup-shaped and convex toward the eardrum 3, as has been described above.

The impression material is brought to flow out from the nozzle via the openings 23. Thanks to the directions of the openings, the flow of impression material will take place essentially obliquely rearwardly, i.e., out toward the walls of the auditory canal and rearward toward the entrance of the auditory canal.

Figure 7:
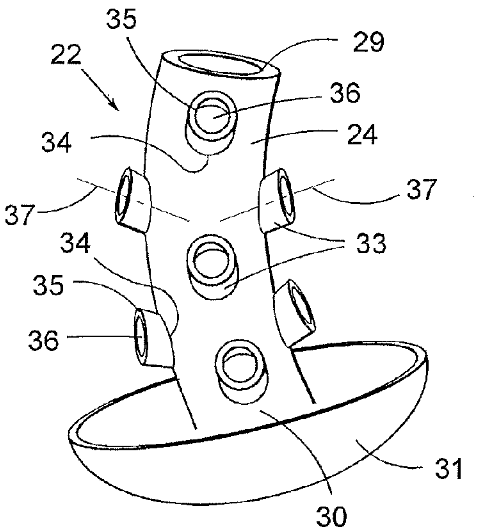
FIG. 7 shows the tubular part of the nozzle in accordance with a fifth embodiment of the invention wherein tubular outlet members are arranged on the outside of the side wall of the tubular part.

FIG. 7 shows the tubular part 22 according to an alternative embodiment of the invention. The tubular part 22 has on the outer side of the side wall 24 thereof one or more projecting tubular outlet members 33. Each one of the tubular outlet members 33 comprises a centre axis 37, a first end 34 that is connected to the side wall 24 of the nozzle adjacent to and over an opening in the side wall 24, as well as a second end 35 having an opening 36 for the outlet of impression material. The tubular outlet members 33 form a continuous passage for the outlet of impression material together with the openings in the side wall 24 of the tubular part. The centre axis 37 of the tubular outlet member 33 has, according to the figure, a direction from the first end 30 of the tubular part, as seen from the centre axis (not shown) of the tubular part through the side wall 24. It is also feasible that the centre axis of the tubular outlet member 33 is essentially perpendicularly arranged to the centre axis of the tubular part 22 at the point where the two axes are intersected. The impression material will be brought to flow from the tubular part 22 of the nozzle out into the auditory canal essentially obliquely outward toward the entrance of the auditory canal via the projecting tubular outlet member 33 according to the embodiment shown in FIG. 7.

Figure 8:
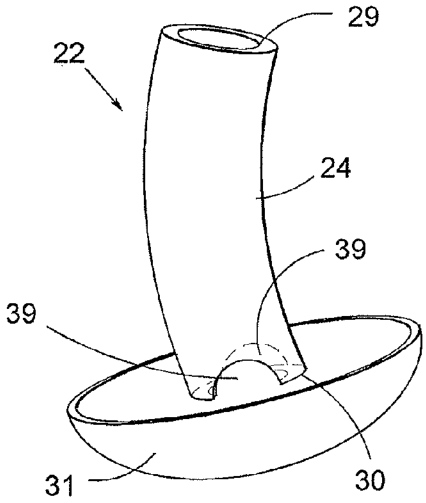
FIG. 8 shows the tubular part of the nozzle in accordance with a sixth embodiment of the invention wherein the first opening is arranged at the first end of the tubular part.

FIG. 8 shows the tubular part according to an alternative embodiment of the invention where the tubular part 22 of the nozzle has a first end 30 and a second end 29 as well as one or more openings 39 for the outlet of impression material. The openings 39 are arranged in the side wall 24 of the tubular part 22 at the first end 30 thereof. In this case, the openings 39 have been illustrated as semicircular, but they may also have another shape. A limiting member 31 having a circular cross-section, as has been described above, is preferably arranged at the first end 30 of the tubular part.

According to the embodiment shown in FIG. 8, the impression material will flow out via the openings 39 essentially perpendicular to the centre axis of the tubular part, i.e., toward the wall of the auditory canal, and, by means of the member 31, be directed outward toward the entrance of the auditory canal.

It should be noted that the embodiment shown in FIG. 8 also may comprise additional openings (not shown) arranged along the extension of the tubular part as shown in FIGS. 2-5 or projecting tubular outlet members as shown in FIG. 7.

Figure 9:
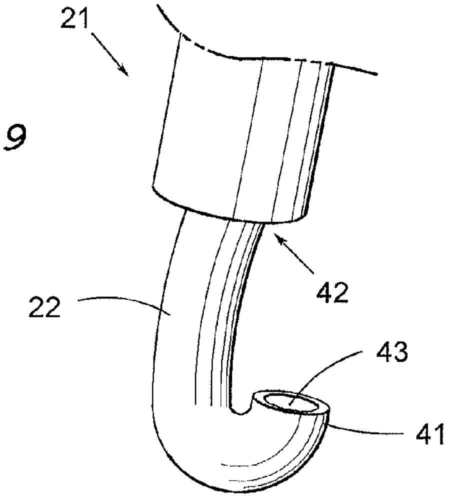
FIG. 9 shows the tubular part of the nozzle in accordance with a seventh embodiment of the invention wherein the tubular part, in the vicinity of said first end, is curved so that said first opening is essentially directed toward the entrance of the auditory canal when said nozzle is inserted in a subject's ear.

FIG. 9 shows an alternative embodiment of the invention, wherein the nozzle 21 comprises a tubular part 22 having a first end 41 intended to be inserted into the auditory canal of a subject and a second end 42 for inlet of impression material to the tubular part 22 from other parts of the device via the rest of the nozzle 21. The tubular part has an opening 43 for the outlet of impression material. In the vicinity of the first end 41 thereof, the tubular part 22 is curved into a U-form so that said opening 43 is essentially directed toward the entrance of the auditory canal when said tubular part is inserted in a subject's ear. It is also feasible that the tubular part can be curved in the vicinity of the first end thereof at an angle that is equal to 90° so that said opening 43 is essentially directed toward the wall of the auditory canal when said tubular part is inserted in a subject's ear. It is also feasible that the opening 43 can be directed in such a way that the impression material is brought to flow obliquely outward toward the entrance of the auditory canal and toward the wall of the auditory canal, i.e., in the vicinity of the first end thereof, the tubular part is curved at an angle that is greater than 90° but smaller than 180°.

The tubular part 22 of the nozzle according to the invention may preferably be curved along essentially the entire extension thereof in order to facilitate introduction into the auditory canal in a subject's ear. It may also preferably be slightly conically shaped in order to facilitate the flow of impression material in it, i.e., the diameter of the centre hole of the tubular part is smaller in the first end of the tubular part than in the second end thereof.

It should be pointed out that the geometrical cross-section of the opening(s) does not have any importance for the present invention. They may, for instance, be essentially circular, oval or consist of semicircles. They may also, for instance, have an essentially quadratic or rectangular shape.

The tubular part has preferably a circular cross-section perpendicular to the centre axis thereof, but may also have a non-circular cross-section. The cross-section of the tubular part may, for instance, be oval, quadratic or rectangular. It is also feasible that the tubular part has a cross-section that has a first geometrical external shape, i.e., the shape that the outer side of the side wall forms perpendicular to the centre axis of the tubular part, and that the hole in the middle of the cross-section, i.e., the centre hole where the impression material flows, has another geometrical cross-sectional shape.

The size and position of the openings along the extension of the tubular part can easily be adapted to the desired injection pattern, i.e., flow of impression material, that is desired. This may also suitably be adapted to the properties, such as viscosity, of the specific impression material that is intended to be used in the impression process in order to thereby guarantee that a suitable flow of impression material is obtained.

Figure 10:
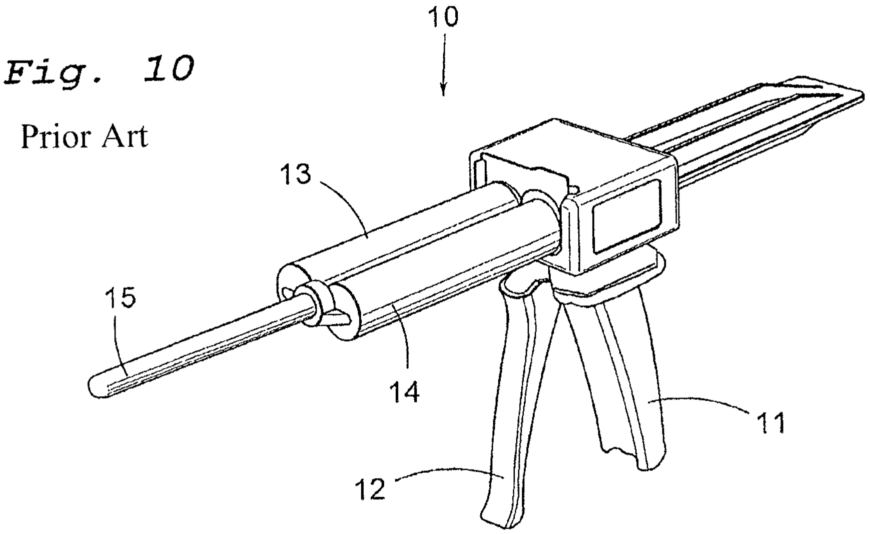
Fig. 10 Prior Art
FIG. 10 shows an impression gun in accordance with prior art.

The nozzle described above can be used on an impression gun, such as the one shown in FIG. 10. In this case, it replaces the nozzle 15 shown in the figure.

The invention claimed is:

1. Device for taking impressions of a subject's ear, comprising a nozzle having an essentially tubular part that has a centre axis and a side wall, said tubular part comprising a first end intended to be inserted into a subject's ear, a first opening for the outlet of impression material, as well as a second end connected to a supply member for impression material to the tubular part, wherein said first opening has a centre axis that is essentially perpendicular to the centre axis of the tubular part alternatively has a direction, as seen from the centre axis of the tubular part through the side wall, from said first end, and wherein said tubular part comprises a plurality of openings serving as outlets for impression material.

2. Device according to claim 1, wherein said first opening is arranged in the side wall of the tubular part.

3. Device according to claim 1, wherein said first end is closed.

4. Device according to claim 1, wherein a limiting member having an essentially circular cross-section is arranged at or adjacent to the first end of the tubular part in such a way that the diameter (D) of said limiting member is essentially perpendicular to the centre axis of the tubular part at said first end.

5. Device according to claim 4, wherein the cross-section of said limiting member is adapted to the cross-section of an auditory canal.

6. Device according to claim 4, wherein said limiting member is essentially cup-shaped in such a way that it is convex toward the eardrum when the tubular part is inserted in a subject's ear.

7. Device according to claim 6, wherein said limiting member is connected to said first end in such a way that the centre axis of the tubular part essentially coincides with the cross-sectional centre of said limiting member.

8. Device according to claim 1, wherein each opening has a centre axis that is essentially perpendicular to the centre axis of the tubular part alternatively has a direction, as seen from the centre axis of the tubular part through the side wall, from said first end.

9. Device according to claim 1, wherein said first opening is arranged essentially at the first end of the tubular part.

10. Device according to claim 1, wherein said openings are distributed along said tubular part of the nozzle.

11. Device according to claim 10, wherein an opening arranged in the vicinity of the second end of the tubular part is larger than an opening arranged in the vicinity of the first end of the tubular part.

12. Device according to claim 1, wherein at least one projecting, essentially tubular outlet member is arranged on the outer side of the side wall of said tubular part, this outlet member having a first end connected to said tubular part in such a way that it forms a continuous passage for the outlet of impression material with said first opening, and a second end having an opening intended for the outlet of impression material.

13. Device according to claim 4, wherein said limiting member is made of an elastically deformable material.

14. Device according to claim 1, wherein said tubular part of the nozzle is curved.

15. Device for taking impressions of a subject's ear, comprising a nozzle having an essentially tubular part that has a centre axis and a side wall, said tubular part comprising a first end intended to be inserted into a subject's ear, a first opening for the outlet of impression material arranged in said first end, as well as a second end connected to a supply member for impression material to the tubular part, wherein said tubular part, in the vicinity of said first end, is curved at an angle that is equal to or greater than 90° so that said first opening is essentially directed toward the mouth of the auditory canal when said tubular part is inserted in a subject's ear.

16. Device for taking impressions of a subject's ear, comprising a nozzle having an essentially tubular part that has a centre axis and a side wall, said tubular part comprising a first end intended to be inserted into a subject's ear, as well as a second end connected to a supply member for impression material to the tubular part, wherein the tubular part comprising a plurality of openings serving as outlets of impression material, said openings arranged in the side wall of the tubular part and distributed along an extension of the tubular part adapted to be inserted into the subject's ear when the impression is made.

17. Device according to claim 16, further comprising a limiting member having an essentially circular cross-section arranged at or adjacent the first end of the tubular part in such a way that the diameter (D) of said limiting member is essentially perpendicular to the centre axis of the tubular part at said first end.

18. Device according to claim 17, wherein said limiting member is essentially cup-shaped in such a way that it is convex toward the eardrum when the tubular part is inserted in a subject's ear.

19. Method for taking an impression of a subject's ear, comprising supplying impression material to the ear by a device comprising a nozzle having an essentially tubular part that has a centre axis and a side wall, said tubular part comprising a first end intended to be inserted into a subject's ear, a first opening for the outlet of impression material, as well as a second end connected to a supply member for impression material to the tubular part, wherein said first opening has a centre axis that is essentially perpendicular to the centre axis of the tubular part alternatively has a direction, as seen from the centre axis of the tubular part through the side wall, from said first end, and wherein said tubular part comprises a plurality of openings serving as outlets for impression material, and allowing the impression material to solidify in order to form the impression, whereupon the impression is removed from the ear.

* * * * *